(12) United States Patent
Zhang et al.

(10) Patent No.: US 12,265,564 B2
(45) Date of Patent: Apr. 1, 2025

(54) INSTANCE-LEVEL ADAPTIVE PROPULSION OF EXTERNAL KNOWLEDGE (IAPEK)

(71) Applicant: TENCENT AMERICA LLC, Palo Alto, CA (US)

(72) Inventors: Hongming Zhang, Palo Alto, CA (US); Xiaoman Pan, Palo Alto, CA (US); Wenlin Yao, Mill Creek, WA (US); Jianshu Chen, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/146,765

(22) Filed: Dec. 27, 2022

(65) Prior Publication Data
US 2024/0211501 A1  Jun. 27, 2024

(51) Int. Cl.
  *G06F 16/00*  (2019.01)
  *G06F 16/334*  (2025.01)
  *G06F 16/355*  (2025.01)

(52) U.S. Cl.
  CPC ........ *G06F 16/3344* (2019.01); *G06F 16/355* (2019.01)

(58) Field of Classification Search
  CPC ............................ G06F 16/3344; G06F 16/355
  USPC .......................................................... 707/718
  See application file for complete search history.

(56) References Cited

U.S. PATENT DOCUMENTS

| | | | |
|---|---|---|---|
| 9,471,559 B2 | 10/2016 | Castelli et al. | |
| 10,614,031 B1 * | 4/2020 | Walters | G06N 3/047 |
| 2014/0278407 A1 | 9/2014 | Chelba et al. | |
| 2017/0061960 A1 | 3/2017 | Kurata et al. | |
| 2019/0362233 A1 * | 11/2019 | Aizawa | G06F 18/22 |
| 2020/0026759 A1 * | 1/2020 | Schwarm | G06F 16/953 |
| 2021/0350076 A1 * | 11/2021 | Kantor | G06F 40/30 |
| 2021/0406476 A1 * | 12/2021 | Pan | G06N 7/01 |
| 2022/0188661 A1 * | 6/2022 | Tappin | G06F 16/248 |

FOREIGN PATENT DOCUMENTS

| | | | | |
|---|---|---|---|---|
| CN | 114443813 A | * | 5/2022 | ......... G06F 16/3346 |
| WO | WO-2021047286 A1 | * | 3/2021 | ............. G06F 16/35 |
| WO | WO-2022088672 A1 | * | 5/2022 | ........... G06F 40/166 |

OTHER PUBLICATIONS

International Preliminary Report on Patentability dated Jun. 7, 2023 with a Translation of the Written Opinion of the International Searching Authority in Application No. PCT/US23/14872.

* cited by examiner

*Primary Examiner* — Monica M Pyo
(74) *Attorney, Agent, or Firm* — Sughrue Mion, PLLC

(57) ABSTRACT

There is included a method and apparatus comprising computer code for instance-wise adaptive knowledge injection in a pre-trained language model (PTLM) including determining a necessity of external knowledge in a plurality of queries of a first dataset based on a likelihood that a respective query is solved by internal knowledge of a target model. Then, the one or more queries determined to need external knowledge may be augmented with pieces of external knowledge. A combined dataset may be generated by combining the first dataset and the one or more augmented queries, and the combined dataset may be applied to the target model.

15 Claims, 4 Drawing Sheets

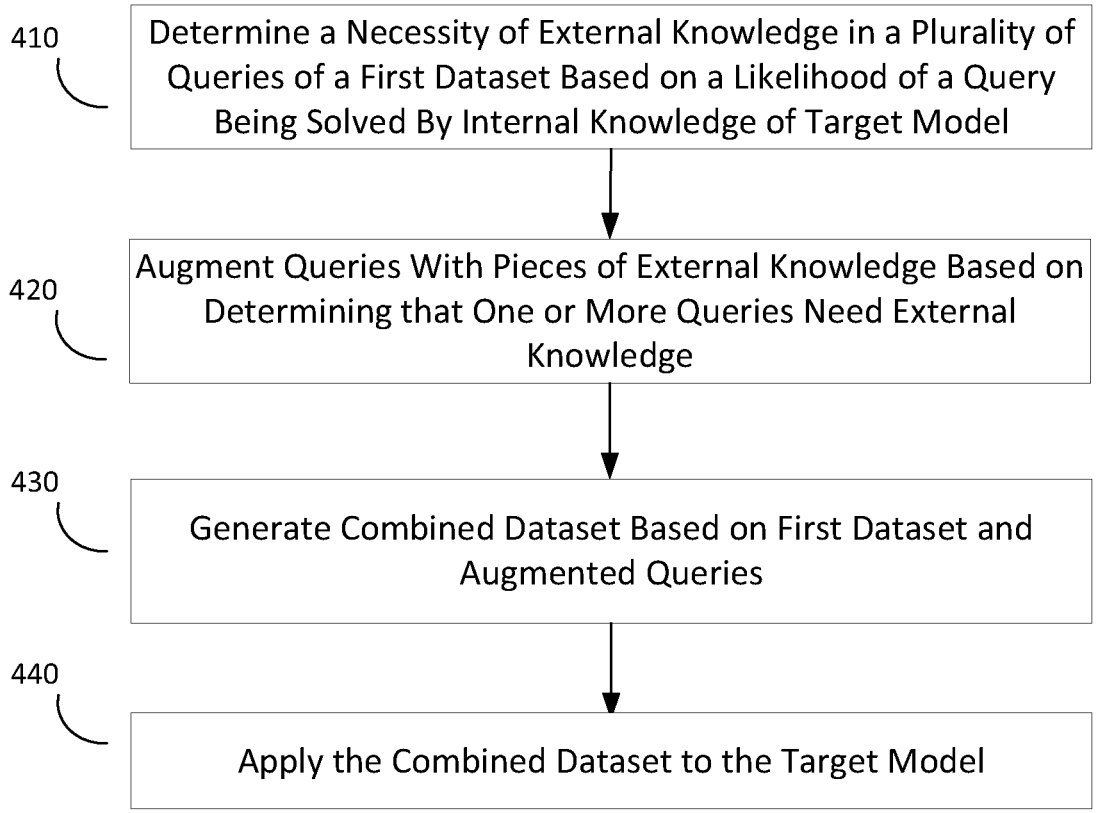

INSTANCE-LEVEL ADAPTIVE PROPULSION OF EXTERNAL KNOWLEDGE (IAPEK)

FIELD

Embodiments of the present disclosure are directed to the field of natural language processing. More specifically, the present disclosure is directed to propulsion of external knowledge in pre-trained language models (PTLM).

BACKGROUND

The paradigm of retrieving knowledge from knowledge bases, augmenting PTLMs, and solving downstream tasks has been explored for some time. Knowledge bases can range from knowledge graphs, documents, pre-processed vectors, other PTLMs, search engines, to Wikipedia documents. A common practice to augment PTLMs includes creating synthesizing datasets, adding knowledge to the prompts, creating demonstrations, and extending feature vectors.

Related art studies the estimation of dataset hardness and model confidence under the context of PTLMs. For dataset hardness, regularized discriminant analysis (RDA) techniques measure the hardness as the cumulative area under the loss curves of cross-fold validation on the test set. Point-wise V-Usable information computes the hardness as entropy difference between the feature-provided case and the blank feature case. Sensitivity Measurement measures the dataset difference by computing the variance of loss of the correct labels on a set of neighbor sentences extracted from generative models with masked original sentences as the inputs.

Other related art focuses on estimating the expected calibration errors (ECE) for classification, quality assurance (QA) and math datasets, as a reflection of model certainty on the correct answers. ECE can be considered as an orthogonal evaluation metric to measure the model's capability of understanding the tasks, compared to common metrics such as accuracy.

While these above-mentioned methods in related art achieve great correlation with the model performance, these methods focus on analyzing the test set performance, thus require test set labels are required. Because they require test set labels, they cannot be applied when predicting the answers.

Therefore, a method is required that achieves great correlation with the model performance but at the same time does not require test labels and can be applied easily to predict answers to NLP queries.

SUMMARY

The present disclosure addresses one or more technical problems.

According to embodiments, a method of instance-wise adaptive knowledge injection in a pre-trained language model (PTLM) may be provided. The method may include determining a necessity of external knowledge in a plurality of queries of a first dataset based on a likelihood that a respective query among the plurality of queries is solved by internal knowledge of a target model; based on determining that one or more queries among the plurality of queries of the first dataset needs external knowledge, augmenting the one or more queries with respective pieces of external knowledge; generating a combined dataset based on combining the first dataset and the one or more augmented queries; and applying the combined dataset to the target model.

An apparatus for instance-wise adaptive knowledge injection in a pre-trained language model (PTLM) may be provided. The apparatus may include at least one memory configured to store computer program code; and at least one processor configured to access the computer program code and operate as instructed by the computer program code. The computer program code may include first determining code configured to cause the at least one processor to determine a necessity of external knowledge in a plurality of queries of a first dataset based on a likelihood that a respective query among the plurality of queries is solved by internal knowledge of a target model; based on determining that one or more queries among the plurality of queries of the first dataset needs external knowledge, first augmenting code configured to cause the at least one processor to augment the one or more queries with respective pieces of external knowledge; first generating code configured to cause the at least one processor to generate a combined dataset based on combining the first dataset and the one or more augmented queries; and first applying code configured to cause the at least one processor to apply the combined dataset to the target model.

A non-transitory computer-readable medium storing computer code configured to, when executed by at least one processor, cause the at least one processor to implement instance-wise adaptive knowledge injection in a pre-trained language model (PTLM) may be provided. The implemented instance-wise adaptive knowledge injection in a pre-trained language model (PTLM) may determine a necessity of external knowledge in a plurality of queries of a first dataset based on a likelihood that a respective query among the plurality of queries is solved by internal knowledge of a target model; based on determining that one or more queries among the plurality of queries of the first dataset needs external knowledge, augment the one or more queries with respective pieces of external knowledge; generate a combined dataset based on combining the first dataset and the one or more augmented queries; and apply the combined dataset to the target model.

BRIEF DESCRIPTION OF THE DRAWINGS

Further features, nature, and various advantages of the disclosed subject matter will be more apparent from the following detailed description and the accompanying drawings in which:

FIG. 4 is a simplified flowchart for external knowledge propulsion in a pre-trained language model (PTLM) according to the embodiments of the disclosure.

DETAILED DESCRIPTION

Figure 1:
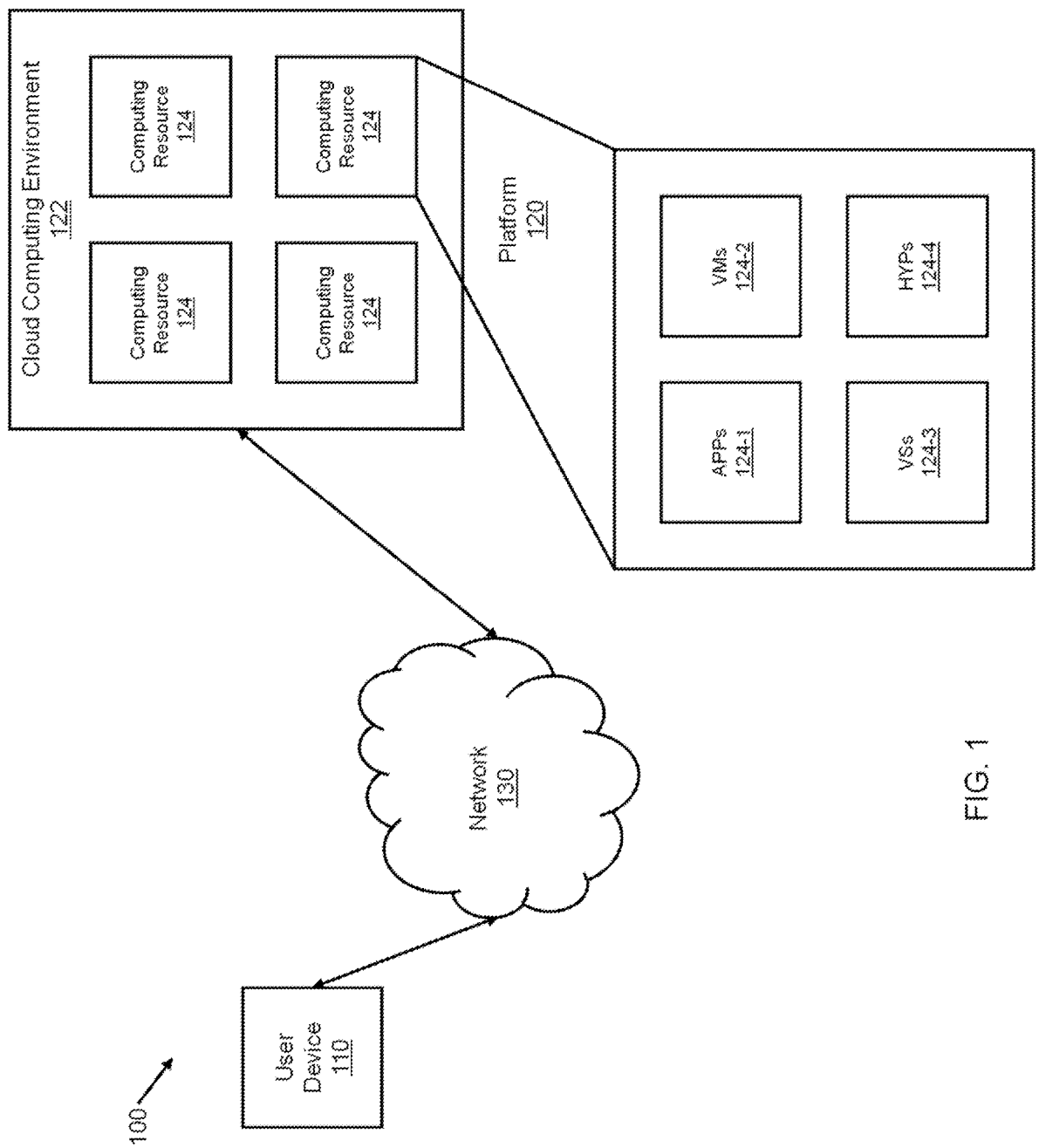
FIG. 1 is a diagram of an environment in which methods, apparatuses and systems described herein may be implemented, according to embodiments.

The present disclosure relates to an instance-specific adaptive propulsion or injection of external knowledge in a pre-trained language model (PTLM). Large-scale PTLMs have achieved great success in various natural language processing (NLP) tasks. While PTLMs encode rich knowledge themselves, in addition to the problems stated above, the knowledge stored in PTLMs can be opaque and static, making external knowledge retrieval necessary. However, there are a few major challenges when using external knowledge. As one example, knowledge indexing and retrieving on large-scale knowledge bases is very time intensive. As another example, the retrieved knowledge can be noisy and sometimes misleading.

Observing that a PTLM does not always need external knowledge, an effective and efficient way to apply knowledge is to inject external knowledge only when the knowledge is essential.

Specifically, an aspect of the present disclosure is directed to instance-level adaptive propulsion of external knowledge (IAPEK), where each instance (sometimes referred to as a "query") is scored on whether the PTLMs need the support of external knowledge. A novel metric, thrust, is proposed which leverages the distribution estimation on seen or training instances.

Experiments detailed below demonstrate that significantly higher cost-efficiency is achieved through thrust when compared to the naive usage of external knowledge on 88% of the evaluated tasks with 26% average performance improvement. These experimental findings shed light on the real-world impact of knowledge enhanced language models that are enhanced with limited external knowledge and only where needed, resulting in lower to computation latency or costs.

According to an aspect of the present disclosure, an Instance-level Adaptive Propulsion of External Knowledge (IAPEK) is proposed as a solution to propel model performance when the external knowledge is useful but noisy. A simple and effective instance-wise metric, thrust, may be used to perform the adaptive knowledge injection. Understanding the delicate usage of potentially noisy knowledge for PTLMs can further enable the models to conduct inference beyond the limitation of implicit internal knowledge.

IAPEK may be applied to any model with original queries and potentially useful external knowledge as a sampling strategy on which portion of instance to be injected with external knowledge pieces, with the aim as improving the cost-efficiency and overall performance.

IAPEK may be defines as follows: for each query qi in a given test set D={q(1), q(2), . . . }. Let f(q) denotes the scoring function of the necessity of external knowledge, and the corresponding scores S={f(q)(1), f(q)(2), . . . } may be extracted. With S, the test set may be re-ranked into D'={q' (1), q'(2), . . . }. Given any threshold t∈R, a subset Dk={q(1)k, q(2) k, . . . } may be sampled as that with highest knowledge need, where for each qk∈ Dk, f(qk)>t. In an embodiment, t may be set as a particular percentile of S, e.g., top 25% of S. For each instance in Dk, external knowledge pieces may be sought and used to augment each query qk to qk+. The updated Dk+ (based on qk+) and original unsampled instances of D/Dk may be combined to generate a new knowledge augmented dataset D+. D+ may be applied to inference models.

Then, thrust, may be used to perform the proposed instance-level adaptive propulsion of external knowledge (IAPEK). Thrust measures how likely the given query can be solved by the internal knowledge of the target model. There are two cases where models can fail to answer a query with internal knowledge: (i) the model has no relevant knowledge and is not familiar with the query semantics or inference types; (ii) the model faces controversial knowledge, where the query may have similar semantics with different kinds of seen questions that potentially require different reasoning to solve.

Given a cluster view of the instance distribution, the distance between the query representation and the instance cluster centers may be used to measure if a query can be solved with internal knowledge. Thus, according to an aspect of the present disclosure, calculating the thrust score of a given query may include (i) estimating the instance distribution in the view of the target model by casting a set of instances into the representation space (ii) conducting any appropriate clustering method (e.g., K-means clustering) on the instance vectors and extracting a set of clusters C, where |C| is relative to the size of estimated instances; (iii) during testing, for the general cases, for each instance query q, calculate vectorized thrust $t_v$. According to an embodiment, calculating ty may include extracting unit vectors pointing from the query vector to the center of each cluster; then calculating $t_v$ as the length of the sum vector of these directed vectors weighted by the size of the each cluster over the square of the Euclidean distance between the query vector and center vectors.

According to an aspect, the last layer hidden states of the models may be used to represent each query instance. For transformer based models (e.g., Text-To-Text Transfer Transformer (T5) based models), the last layers of the decoders may be used.

According to embodiments, for binary classification, the property of binary labels may be leveraged, and a binary thrust to may be used as a variant. Calculating to includes directly calculating, the absolute value of the sum of the weights (cluster size over distance) multiplied by the corresponding numerical labels (i.e., +1 or −1). In short, if r is denoted as the distance between a query and a cluster c, co as the center of cluster c, lc as the label of cluster c, $t_v$ and $t_b$ may be written as:

$$t_v = \left| \sum_{c \in C} \frac{|c|}{r^3} \cdot (\vec{c}_0 - \vec{q}) \right|, \quad \text{Eqn (1)}$$

$$t_b = \left| \sum_{c \in C} l_c \frac{|c|}{r^2} \right|. \quad \text{Eqn (2)}$$

TABLE 1

IAPEK Performance with Thrust

| Dataset | UnifiedQA-base | | | | | | UnifiedQA-large | | | | | | UnifiedQA-3b | | | | | |
|---|---|---|---|---|---|---|---|---|---|---|---|---|---|---|---|---|---|---|
| | 25% | | 50% | | 75% | | 25% | | 50% | | 75% | | 25% | | 50% | | 75% | |
| AGNews | 50.7 | 55.6 | 52.8 | 56.3 | 55.0 | 56.8 | 70.2 | 69.1 | 69.4 | 70.2 | 68.7 | 70.6 | 77.9 | 78.4 | 80.1 | 80.4 | 82.3 | 82.3 |
| e-SNLI | 46.5 | 66.6 | 54.4 | 68.3 | 62.3 | 69.6 | 50.7 | 71.1 | 58.5 | 72.2 | 66.4 | 73.2 | 69.1 | 86.3 | 75.9 | 87.5 | 82.8 | 88.8 |
| CIKQA | 56.9 | 59.6 | 57.8 | 59.6 | 58.7 | 59.9 | 60.2 | 62.1 | 60.8 | 62.3 | 61.5 | 62.4 | 62.7 | 66.9 | 64.1 | 66.9 | 65.5 | 66.9 |

TABLE 1-continued

IAPEK Performance with Thrust

| Dataset | UnifiedQA-base | | | | | | UnifiedQA-large | | | | | | UnifiedQA-3b | | | | | |
|---|---|---|---|---|---|---|---|---|---|---|---|---|---|---|---|---|---|---|
| | 25% | | 50% | | 75% | | 25% | | 50% | | 75% | | 25% | | 50% | | 75% | |
| StrategyQA | 50.7 | 55.6 | 52.8 | 56.3 | 55.0 | 56.8 | 52.9 | 62.1 | 57.4 | 65.3 | 61.9 | 65.9 | 64.1 | 74.3 | 70.5 | 81.4 | 77.0 | 82.9 |
| BoolQ | 65.5 | 76.2 | 70.7 | 79.9 | 75.8 | 80.9 | 65.9 | 77.7 | 72.1 | 81.3 | 78.3 | 84.4 | 68.1 | 79.1 | 74.6 | 85.7 | 81.2 | 87.1 |
| ARC-E | 50.7 | 55.6 | 52.8 | 56.3 | 55.0 | 56.8 | 64.5 | 64.6 | 65.0 | 64.7 | 65.5 | 65.1 | 74.4 | 74.6 | 75.1 | 74.9 | 75.8 | 75.1 |
| ARC-C | 44.9 | 43.8 | 45.0 | 44.5 | 45.1 | 44.8 | 53.8 | 50.8 | 52.3 | 51.2 | 50.9 | 51.5 | 64.5 | 63.9 | 64.4 | 64.9 | 64.3 | 65.6 |
| WQ | 19.2 | 26.3 | 27.5 | 42.1 | 35.8 | 43.8 | 22.5 | 38.5 | 30.5 | 39.0 | 38.5 | 46.0 | 20.9 | 19.3 | 30.0 | 35.4 | 39.1 | 46.4 |
| TREC | 13.5 | 33.6 | 21.3 | 36.4 | 29.1 | 36.9 | 30.8 | 32.7 | 32.7 | 36.0 | 34.6 | 36.3 | 19.6 | 37.8 | 27.0 | 40.6 | 34.4 | 40.9 |
| HotpotQA | 25.2 | 32.9 | 30.2 | 35.5 | 35.2 | 37.8 | 26.7 | 35.2 | 32.1 | 37.5 | 37.4 | 40.2 | 24.9 | 41.9 | 32.3 | 43.9 | 39.7 | 45.7 |
| TriviaQA | 32.0 | 52.7 | 43.2 | 56.4 | 54.4 | 60.0 | 32.4 | 59.7 | 46.4 | 64.3 | 60.5 | 71.8 | 39.2 | 68.3 | 52.8 | 71.0 | 66.4 | 73.4 |
| NQ | 20.0 | 33.0 | 24.9 | 33.5 | 29.7 | 33.9 | 12.0 | 34.8 | 20.1 | 35.2 | 28.2 | 35.7 | 12.8 | 35.9 | 21.1 | 36.5 | 29.4 | 37.0 |

Table 1 indicates performance of IAPEK leveraging Thrust with 25%, 50%, and 75% percent instances augmented with their corresponding knowledge across a plurality of datasets. The first column among every two column pair indicate performances before Thrust and the second column indicates performance after thrust.

As seen from Table 1, performance of the PTLM consistently gets better using Thrust from the base to the 3B model. Through clustering the instances, the whole instance distribution in the eyes of the models is acquired. Then with distance to the cluster, Thrust represents how well the model can categorize a new query vector and find its similarity with others on the task. Leveraging such information, Thrust identifies the no knowledge and controversial knowledge cases well and puts the knowledge into the most necessary queries.

The gain in performance is higher when the portion of augmented instances is smaller. For example, for UnifiedQA-3b, the gains from Thrust with 25% instances augmented with knowledge are 6.1%, 13.56% on MC classification and QA tasks, respectively, while for the 75% case, the gains are 2.8% and 6.8%. Therefore, Thrust is most effective on identifying the most necessary queries because Thrust is sensitive to the distance change so the isolated queries can be easily identified.

Consistent failure is observed when Thrust is applied on ARC-C. The reason is that the queries in ARC-C are designed as open questions, and the answers are usually about plans or ideas, not facts, making it very hard for the small-size models to extract useful information from the seemingly unrelated external knowledge. As an example, a query from ARC-C may be "Juan and Lakeisha roll a few objects down a ramp. They want to see which object rolls the farthest. What should they do so they can repeat their investigation?" For questions of this style, it is even hard for humans to find a relevant external knowledge that can help. This observation further highlights a pre-condition of Thrust, an assumption that external knowledge is not always useful and can be very noisy.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
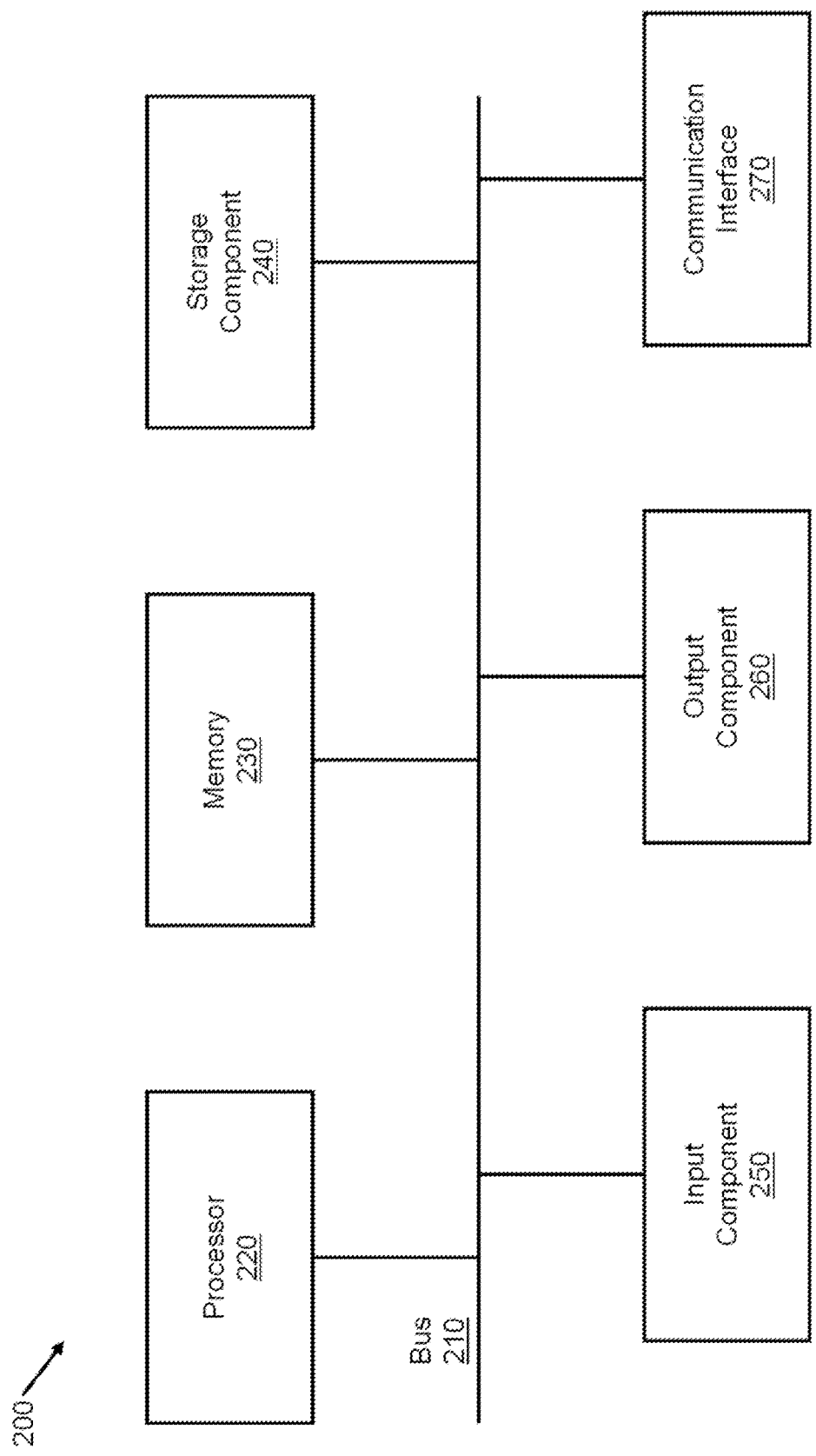
FIG. 2 is a diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
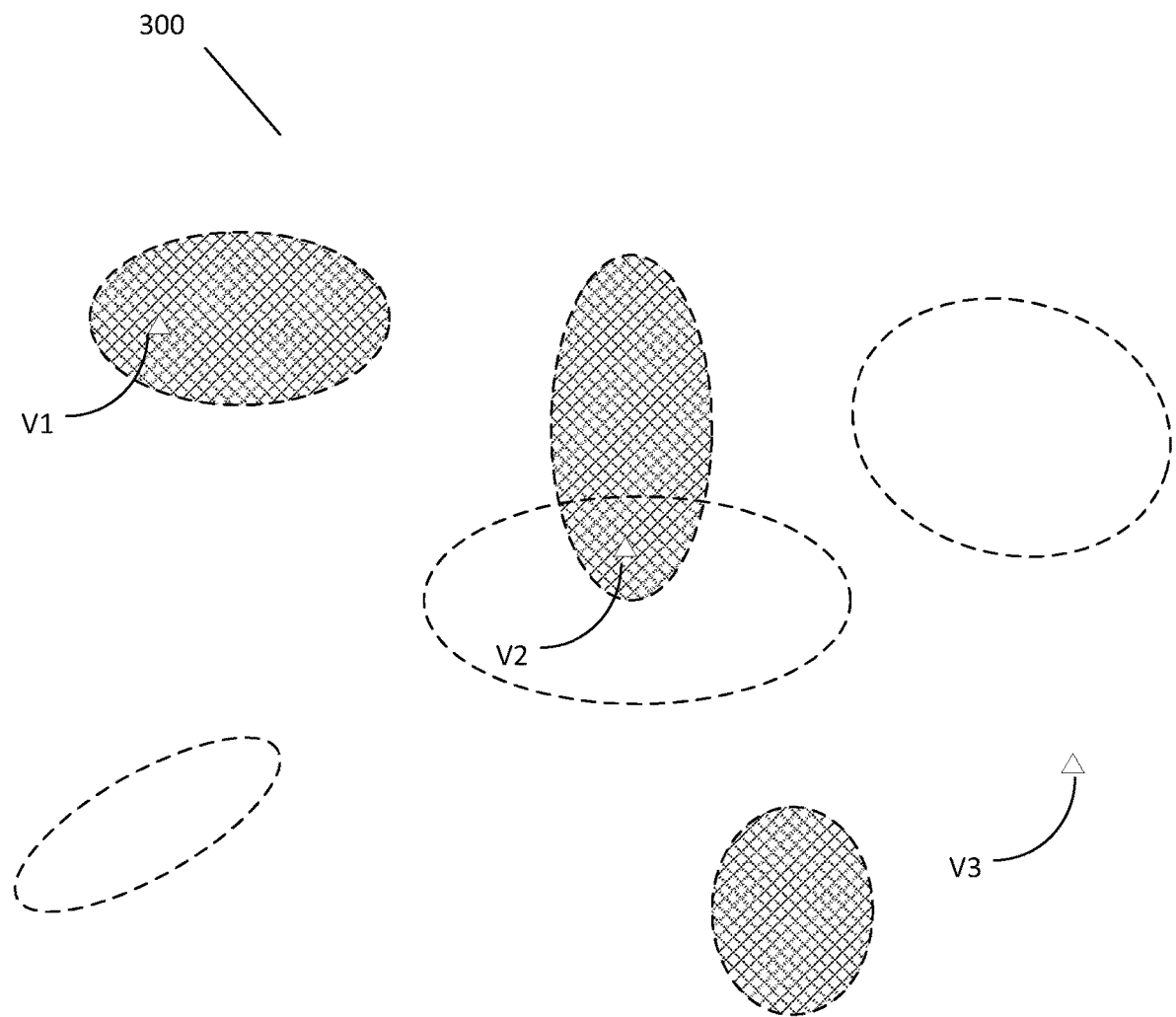
FIG. 3 is a simplified diagram of illustrating clustering of queries or instances according to embodiments of the disclosure.

FIG. 3 illustrates an example diagram 300 of clustering of queries or instances according to embodiments.

As shown in FIG. 3, diagram 300 includes a plurality of clusters, each cluster may have its own label. Diagram 300 also includes vectors V1, V2, and V3. Vector VI is associated with only 1 cluster, Vector V2 is associated with 2 clusters, representing controversial internal knowledge; and Vector V3 is too far from any cluster to be associated with a cluster.

According to an embodiment of the present disclosure, the Thrust score for V1 may not indicate a need for external knowledge because VI is close to only one cluster. However, the Thrust score for V2 may indicate controversial knowledge for the query associated with V2, i.e., different solution or reasoning, because it is associated with 2 clusters. According to another embodiment, the Thrust score for V3 may indicate need for external knowledge because it is not close to any cluster indicating a lack of internal knowledge for the query associated with V3.

FIG. 4 illustrates an example process 400 for external knowledge propulsion in a PTLM, according to embodiments.

At operation 410, a necessity of external knowledge in a plurality of queries of a first dataset may be determined based on a likelihood that a respective query among the plurality of queries is solved by internal knowledge of a target model. In some embodiments, the likelihood that the respective query may be solved by internal knowledge of the target model may be based on whether the target model has no relevant knowledge, the target model is not familiar with the respective query, or the target model includes controversial knowledge associated with the respective query. Controversial knowledge associated with the respective query may include the respective query being associated with different questions or the respective query being associated with different reasoning.

According to an aspect, the likelihood that the respective query may be solved by internal knowledge of the target model may be based on a thrust score of the respective query, wherein the thrust score may be based on a distance of a query representation of the respective query and at least one cluster center associated to the respective query.

According to an aspect, determining the thrust score may include generating a query distribution based on the target model; generating one or more clusters based on the query distribution; for a query among the plurality of queries, determining one or more unit vectors associated with the query that pointing from a query vector of the query to a center of each cluster among the one or more clusters, wherein each unit vector may associated with the query and a respective cluster among the one or more clusters; and determining the thrust score for the query based on a sum vector of the one or more unit vectors weighted by a size of each of the one or more clusters. In some embodiments, the thrust score may be further based on a division with a square of a Euclidean distance between the query vector and a center vector at the center of each cluster. According to an aspect, the query distribution may be generated based on a last layer hidden states of the target model or one or more last layers of decoders of the target model. According to an embodiment, the first dataset may include any test dataset to be used in a specific PTLM task. The target model may be a model based on a target task to be performed using the PTLM.

Although FIG. 4 shows example blocks of the process 400, in embodiments, the process 400 may include additional blocks, fewer blocks, different blocks, or differently arranged blocks than those depicted in FIG. 4. In embodiments, any blocks of process 400 may be combined or arranged in any amount or order, as desired. In embodiments, two or more of the blocks of the process 400 may be performed in parallel.

The techniques described above, can be implemented as computer software using computer-readable instructions and physically stored in one or more computer-readable media or by a specifically configured one or more hardware processors. For example, FIG. 1 shows an environment 100 suitable for implementing various embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of instance-wise adaptive knowledge injection in a large language pre-trained language model (PTLM), the method being executed by at least one processor, the method comprising:
   determining whether external knowledge is needed for a respective query in a plurality of queries of a first dataset based on a thrust score of the respective query using internal knowledge of a target large scale pre-trained language model, wherein determining the thrust score comprises:
   generating a query distribution based on the target lar e scale pre-trained language model;
   generating one or more clusters based on the query distribution;
   for the respective query among the plurality of queries, determining one or more unit vectors associated with the query that pointing from a query vector of the query to a center of each cluster among the one or more clusters, wherein each unit vector is associated with the query and a respective cluster among the one or more clusters; and
   determining the thrust score for the respective query based on a sum vector of the one or more unit vectors weighted by a size of each of the one or more clusters, and
   wherein each query in the or more clusters is represented using last layer hidden states of the target large scale pre-trained language model associated with each query;
   based on determining that external knowledge is needed for one or more queries among the plurality of queries of the first dataset, augmenting the one or more queries with respective pieces of external knowledge;
   generating a combined dataset based on combining the first dataset and the one or more augmented queries; and
   applying the combined dataset to the target large scale pre-trained language model.

2. The method of claim 1, wherein determining whether external knowledge is needed is based on whether the target large scale pre-trained language model has no relevant knowledge, the target large scale pre-trained language model is not familiar with the respective query, or the target large scale pre-trained language model includes controversial knowledge associated with the respective query.

3. The method of claim 2, wherein the controversial knowledge associated with the respective query comprises the respective query being associated with different questions or the respective query being associated with different reasoning.

4. The method of claim 1, wherein the thrust score for the respective query among the plurality of queries is further based on a division with a square of a Euclidean distance between the query vector and a center vector at the center of each cluster.

5. The method of claim 1, wherein the last layer hidden states of the target large scale pre-trained language model are used to generate the query distribution.

6. The method of claim 1, wherein one or more last layers of decoders of the target large scale pre-trained language model are used to generate the query distribution.

7. An apparatus for instance-wise adaptive knowledge injection in a pre-trained language model (PTLM), the apparatus comprising:
   at least one memory configured to store computer program code;
   at least one processor configured to access the computer program code and operate as instructed by the computer program code, the computer program code including:
   first determining code configured to cause the at least one processor to determine whether external knowledge is needed for a respective query in a plurality of queries of a first dataset based on a thrust score of the respective query using internal knowledge of a target large scale pre-trained language model,
   wherein each query in the one or more clusters is represented using last layer hidden states of the target large scale pre-trained language model associated with each query;
   based on determining that external knowledge is needed for one or more queries among the plurality of queries of the first dataset, first augmenting code configured to cause the at least one processor to augment the one or more queries with respective pieces of external knowledge;
   first generating code configured to cause the at least one processor to generate a combined dataset based on combining the first dataset and the one or more augmented queries; and
   first applying code configured to cause the at least one processor to apply the combined dataset to the target large scale pre-trained language model,
   wherein the first determining code comprises:
   second generating code configured to cause the at least one processor to generate a query distribution based on the target large scale pre-trained language model;
   third generating code configured to cause the at least one processor to generate one or more clusters based on the query distribution;
   second determining code configured to cause the at least one processor to determine, for the respective query among the plurality of queries, one or more unit vectors associated with the query that pointing from a query vector of the query to a center of each cluster among the one or more clusters, wherein each unit vector is associated with the query and a respective cluster among the one or more clusters; and
   third determining code configured to cause the at least one processor to determine the thrust score for the query based on a sum vector of the one or more unit vectors weighted by a size of each of the one or more clusters.

8. The apparatus of claim 7, wherein determining whether external knowledge is needed is based on whether the target large scale pre-trained language model has no relevant knowledge, the target large scale pre-trained language model is not familiar with the respective query, or the target large scale pre-trained language model includes controversial knowledge associated with the respective query.

9. The apparatus of claim 8, wherein the controversial knowledge associated with the respective query comprises the respective query being associated with different questions or the respective query being associated with different reasoning.

10. The apparatus of claim 7, wherein the thrust score for the respective query among the plurality of queries is further based on a division with a square of a Euclidean distance between the query vector and a center vector at the center of each cluster.

11. The apparatus of claim 7, wherein the last layer hidden states of the target large scale pre-trained language model are used to generate the query distribution.

12. The apparatus of claim 7, wherein one or more last layers of decoders of the target large scale pre-trained language model are used to generate the query distribution.

13. A non-transitory computer-readable medium storing computer code that is configured to, when executed by at least one processor, cause the at least one processor to implement instance-wise adaptive knowledge injection in a pre-trained language model (PTLM) that:

determines whether external knowledge is needed for a respective query in a plurality of queries of a first dataset based on a thrust score of the respective query using internal knowledge of a target large scale pre-trained language model, wherein determining the thrust score comprises:

generating a query distribution based on the target large scale pre-trained language model, generating one or more clusters based on the query distribution, for the respective query among the plurality of queries, determining one or more unit vectors associated with the query that pointing from a query vector of the query to a center of each cluster among the one or more clusters, wherein each unit vector is associated with the query and a respective cluster among the one or more clusters, determining the thrust score for the respective query based on a sum vector of the one or more unit vectors weighted by a size of each of the one or more clusters, and wherein each query in the one or more clusters is represented using last layer hidden states of the target large scale pre-trained language model associated with each query;

based on determining that external knowledge is needed for one or more queries among the plurality of queries of the first dataset, augments the one or more queries with respective pieces of external knowledge;

generates a combined dataset based on combining the first dataset and the one or more augmented queries; and applies the combined dataset to the target large scale pre-trained language model.

14. The non-transitory computer-readable medium of claim 13, wherein determining whether external knowledge is needed is based on whether the target large scale pre-trained language model has no relevant knowledge, the target large scale pre-trained language model is not familiar with the respective query, or the target large scale pre-trained language model includes controversial knowledge associated with the respective query.

15. The non-transitory computer-readable medium of claim 14, wherein the controversial knowledge associated with the respective query comprises the respective query being associated with different questions or the respective query being associated with different reasoning.

\* \* \* \* \*